United States Patent [19]

Newman

[11] 4,308,324

[45] Dec. 29, 1981

[54] PURIFICATION PROCESS FOR LITHIUM BATTERY ELECTROLYTES

[75] Inventor: Gerald H. Newman, Westfield, N.J.

[73] Assignee: Exxon Research & Engineering Co., Florham Park, N.J.

[21] Appl. No.: 165,624

[22] Filed: Jul. 3, 1980

[51] Int. Cl.³ .............................................. H01M 6/16
[52] U.S. Cl. .................................... 429/188; 210/757; 210/758
[58] Field of Search ................. 429/188, 194; 210/757, 210/758, 719, 722; 423/179; 203/31, 32, 28, 29

[56] References Cited

U.S. PATENT DOCUMENTS 3,463,606  8/1969  Smit et al. ............................ 423/180

Primary Examiner—Anthony Skapars
Attorney, Agent, or Firm—Robert S. Salzman

[57] ABSTRACT

A method is described for purifying electrolytes used in alkali battery systems. An electrolyte is mixed with or fed through a column containing a mercury amalgam of the alkali of the electrolyte salt. The amalgam reduces the alkali-metal reactive impurities within the electrolyte. The electrolyte is also mixed with an oxidizing agent or fed through a column containing the oxidizing agent in order to oxidize impurities in the electrolyte.

Electrolytes so treated will exhibit improved cycling capabilities, because the electrolyte will now be devoid of impurities which respectively can react with the anode and cathode of the battery.

65 Claims, 3 Drawing Figures

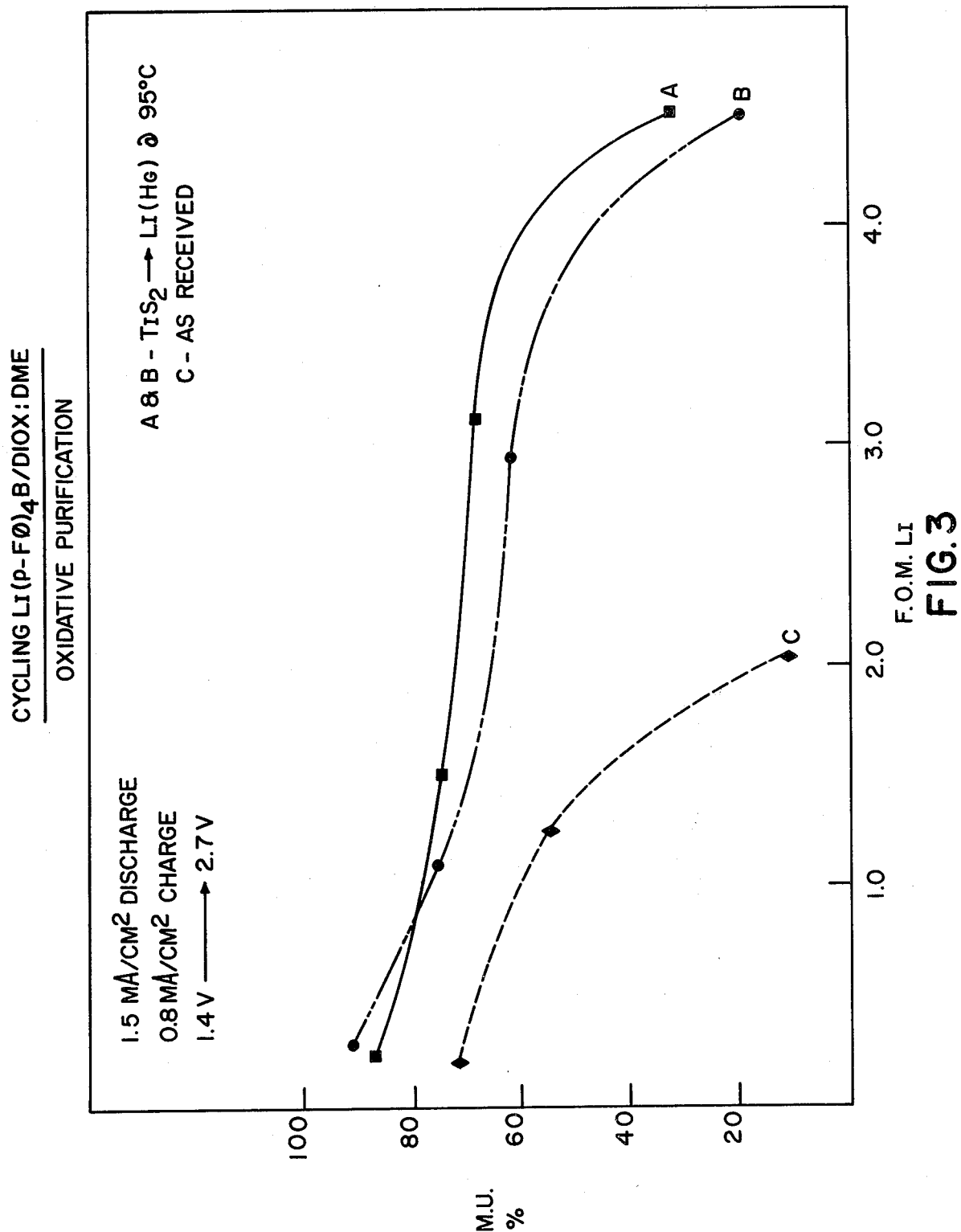

PURIFICATION PROCESS FOR LITHIUM BATTERY ELECTROLYTES

FIELD OF THE INVENTION

The invention relates to improved electrolytes for use in alkali-battery systems, and more particularly to a method of purifying alkali salt-containing electrolytes.

BACKGROUND OF THE INVENTION

It has been determined that cyclic performance of alkali battery cells are substantially affected by the purity of the electrolytes used in these cells. Therefore, it has been found necessary to devise effective procedures for eliminating or substantially reducing the impurities of these electrolytes. The impurities have been found in both the salt solutes of the electrolytes and also in their organic solvents. Sometimes, impurities will result upon mixing of the salt solute with the organic solvent irregardless of their purity.

It has been discovered that at least two types of impurity can be found in electrolytes: (a) those that react directly with the alkali metal anode and are reduced thereby: and (b) those that react with the cathode and are thereby oxidized. The product or products of this oxidation can then further react with the anode as in (a) above.

The invention discloses a method of inactivating or eliminating both types of impurities.

DISCUSSION OF RELEVANT ART

In a U.S. patent to W. M. SMIT, et al, U.S. Pat. No. 3,463,606, issued Aug. 26, 1969, a method of separating and purifying lithium isotopes is disclosed. Lithium is selectively isolated with respect to its isotopes by use of two liquids: a lithium amalgam and a salt of lithium in an organic liquid such as dioxane or alcohol.

While substances are disclosed in SMIT, et al, which bear a similarity to those used in the purification method of the invention, there is no teaching in the SMIT, et al, patent that any of the disclosed procedures or substances will remove harmful impurities or deleterious substances of the types referred to above, from alkali-containing electrolytes.

In addition, there is no recognition in the SMIT, et al, patent that removal of the anode and cathode reactive impurities from electrolytes, will substantially improve the cyclic performance of the electrolyte-containing battery cells.

BRIEF SUMMARY OF THE INVENTION

The invention pertains to a method of purifying an electrolyte for use in alkali batteries. The electrolyte is generally one containing at least one alkali salt solute contained in at least one organic solvent. The method comprises the steps of: (a) adding to the electrolyte a mercury amalgam of the alkali salt of the electrolyte; and (b) sufficiently agitating the electrolyte containing the mercury-alkali amalgam to inactivate impurities in the electrolyte.

Generally, this procedure will inactivate only the anode-active impurities and additional method steps must be employed to inactivate the cathode-active impurities. Such additional steps include: (c) adding an oxidizing agent to the electrolyte; and (d) agitating the oxidizing agent and the electrolyte.

The procedure encompassed by steps (c) and (d) above may preferably be done prior to steps (a) and (b) above, or may be done subsequently thereto, by repeating steps (a) and (b) thereafter.

The above procedures may also be accomplished by running an electrolyte through a column containing the amalgam and/or oxidizing agent.

Generally speaking, both the above methodologies require sufficient reactive contact between the electrolyte and the amalgam and/or oxidizing agent, such that the impurities can be reacted, i.e., can be reduced and/or oxidized.

In order to insure sufficient reactive contact between the electrolyte and the amalgam and/or oxidizing agent, the solution can be agitated, stirred, or otherwise mixed in a pressure vessel at an elevated temperature such as 95° C.

The preferred alkali battery system is a lithium system having at least one lithium salt solute which is an organoboron complex anion, disposed in an organic solvent of at least one of the following: ethers, esters, sulfones, organic sulfates, organic sulfites, organic nitrites, and organic nitro compounds.

The preferred organic solvent is dioxolane or a mixture of dioxolane and dimethoxyethane.

Oxidizing agents which can be used to purify the electrolyte can be: $TiS_2$; $MnO_2$; $FeS_2$; $FeS$; $V_2O_5$; $MoS_2$; and $CuS$, but are not limited to the above substances which are only listed as an exemplary teaching.

The mercury-alkali amalgam for the preferred lithium system will be a lithium-mercury amalgam containing approximately 5 atomic percent of lithium. The percentage of alkali in the amalgam will determine whether the amalgam will be liquid at the desired reaction temperature and pressure.

It is an object of this invention to provide a method of purifying electrolytes used in alkali battery systems;

It is another object of the invention to provide a method of inactivating impurities in electrolytes used in alkali battery systems which contain impurities which are reduced by the anode and/or are oxidized by the cathode of the battery; and It is a further object of this invention to provide a means of improving the cyclic capabilities of an alkali battery system by purifying its electrolyte.

These and other objects of the invention will become more apparent and will be better understood with reference to the following detailed description considered in conjunction with the accompanying drawings.

BRIEF DESCRIPTION OF THE DRAWINGS

FIGS. 1–3 are graphs illustrating the improvement in cycling capability of a lithium battery cell when the electrolyte is purified;

FIG. 1 shows the Figure of Merit versus material utilization of a cell containing an electrolyte containing a salt of $Li(M-CF_3\phi)_4B$ contained in a solvent mixture of dioxolane and dimethoxyethane;

FIG. 2 depicts the Figure of Merit versus material utilization of the same battery cell having an electrolyte with a salt solute of lithium tetraphenyl-borate in a solvent mixture of dioxolane and dimethoxyethane; and FIG. 3 illustrates the Figure of Merit versus material utilization of the same battery cell having an electrolyte containing a lithium salt solute of $Li(p-F\phi)_4B$ disposed in a solvent mixture of dioxolane and dimethoxyethane.

DETAILED DESCRIPTION OF THE INVENTION

A lithium battery cell was constructed having a lithium anode of lithium ribbon pressed on an expanded nickel or titanium screen. The cathode was a porous cake of a mixture of TiS$_2$ and Teflon (90–95% TiS$_2$ and 5–10% Teflon) pressed onto an expanded nickel, tantalum or titanium screen or aluminum screen. The anode and cathode were separated by placing the anode and cathode in microporous polypropylene bags sold under the name "Celgard" by Celanese Corporation of America, New York. A polypropylene mat was also placed between the anode and the cathode. The cells were also provided with a reference lithium electrode of lithium ribbon pressed on a tantalum or nickel screen. The references was also in a microporous polypropylene bag and separated from the cathode by a polypropylene mat. The reference electrode was located on the side of the cathode opposite the anode.

EXAMPLES

Three different lithium borate electrolytes were tested in the above-described battery cell. The first electrolyte was comprised of lithium tetraphenyl borate (Li$\phi_4$B) in a solution mixture of 1,3 dioxolane and 1,2 dimethoxyethane (0.6 moles Li$\phi_4$B dissolved in 1 liter of a dioxolane and 1,2 dimethoxyethane solvent in the ratio of 79.1 w/o dioxolane to 20.9 w/o dimethoxyethane).

Figure 2:
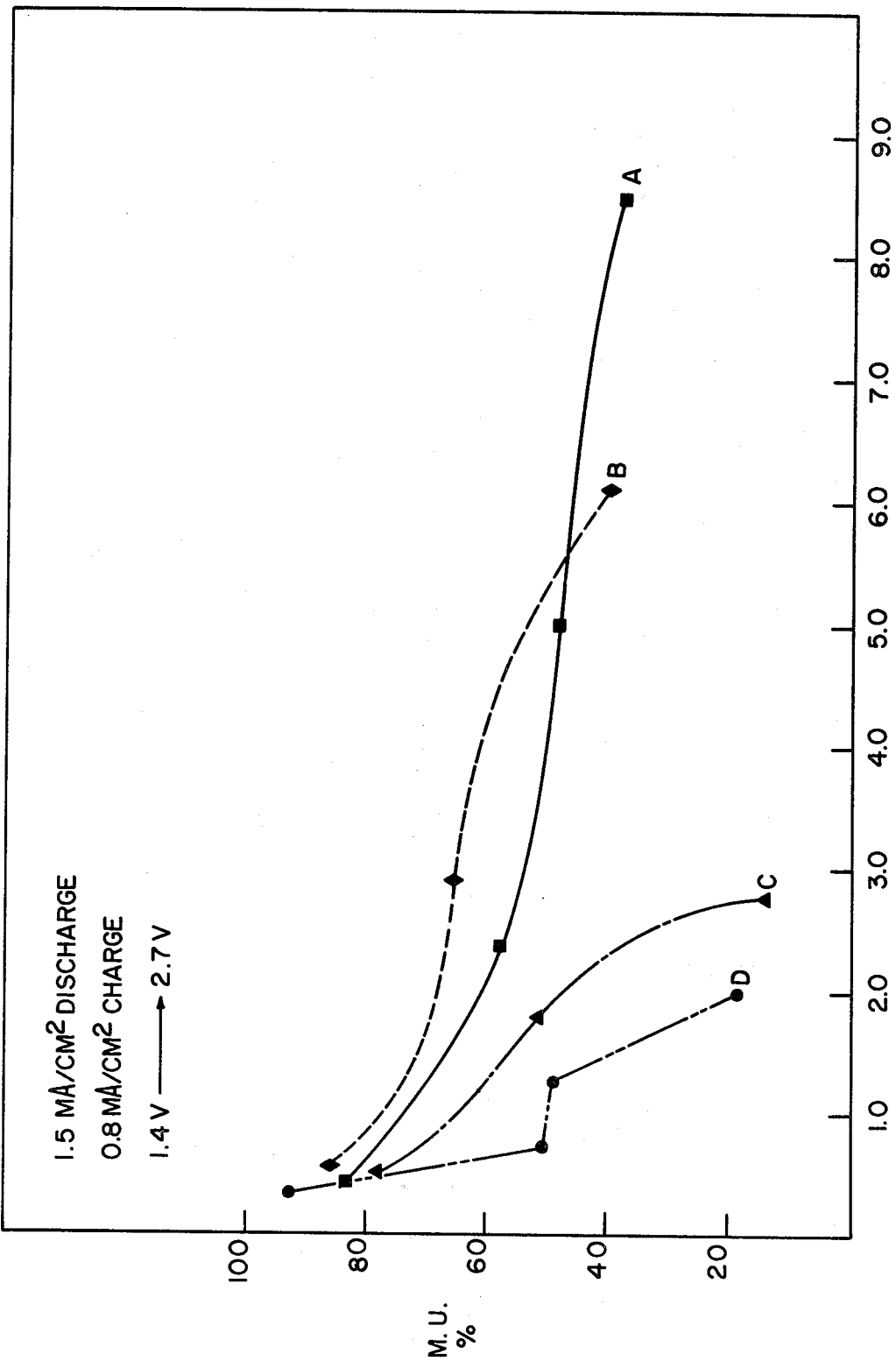

This electrolyte was purified in accordance with the invention, by adding a solution of lithium metal in mercury Li(Hg) of about 5 atomic percent Li, and stirring at 95° C. for about 100 hours in a pressure vessel and then separating the electrolyte from the amalgam. This purification treatment improved the cyclic capability of the cell from an F.O.M. of lithium of less than 1 at 0.5 mA/cm$^2$ discharge rate, to an F.O.M. of Li greater than 8.0 at 1.5 mA/cm$^2$ discharge rate, as shown in FIG. 2. Curves C and D are performance curves for the unpurified electrolyte, while curves A and B are for the purified electrolyte. The above treatment effectively eliminated those impurities in the electrolyte which were reactive with the lithium anode, and which could have been thereby reduced.

The second and third electrolytes were comprised respectively of Li(p-F$\phi$)$_4$B and Li(M-CF$_3\phi$)$_4$B in a solution mixture of 1,3 dioxolane and 1,2 dimethoxyethane (0.6 moles Li(M-CF$_3\phi$)$_4$B and 0.5 moles Li(p-F$\phi$)$_4$B each dissolved in 1 liter of a dioxolane and 1,2 dimethoxyethane solvent in the ratio of 79.1 w/o dioxolane to 20.9 w/o dimethoxyethane).

These two electrolytes were first heated and stirred with an oxidizing agent such as TiS$_2$ or MnO$_2$ to about 95° C. in a pressure vessel, and then filtered. After filtering out the oxidized impurities, these electrolytes were further treated with Li(Hg) as described above.

Figure 1:
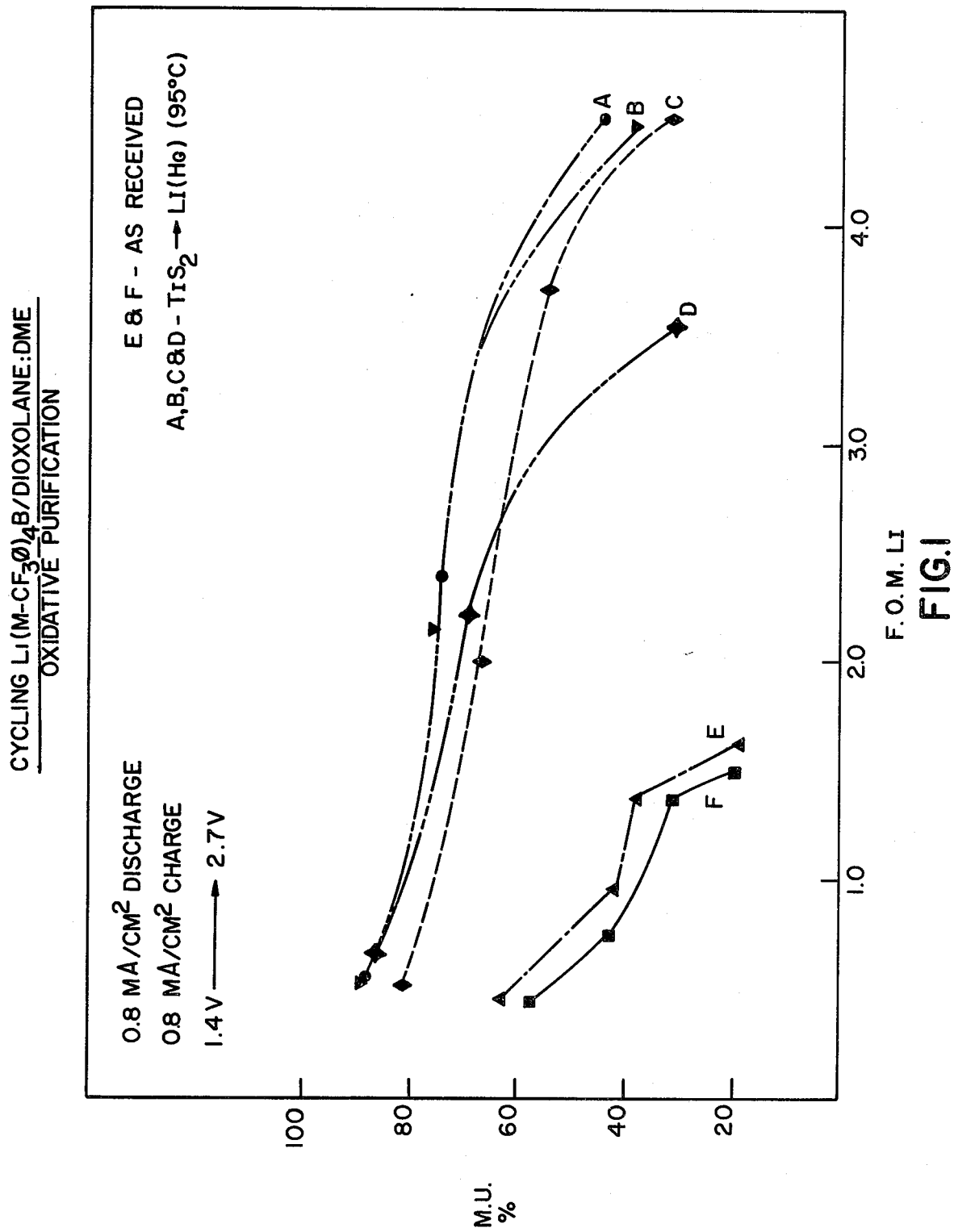

These purified electrolytes show a greater cyclic capability than their unpurified counterparts, as evidenced by the graphs in FIGS. 1 and 3.

In FIG. 1, curves E and F represent untreated electrolyte, while curves A, B, C, and D represent the purified electrolyte. The curves for the pure electrolyte clearly indicate that Figures of Merit of Li are improved from less than 1.0 to over 4.0 at a 0.8 mA/cm$^2$ discharge rate.

Similarly, curves A and B in FIG. 3 represent pure electrolyte in comparison to curve C. The improvement in the Figure of Merit of Li is similar to that shown in FIG. 1.

The purification procedure as described herein is useful for any organic-based electrolyte used in any alkali battery system, which is kinetically stable between the potentials of the reducing agent and the oxidizing agent employed.

Having thus described the invention, what is desired to be protected by Letters Patent is presented by the following appended claims.

What is claimed is:

1. A method of purifying an electrolyte for use in alkali batteries, said electrolyte containing at least one alkali salt solute contained in at least one organic solvent, comprising the steps of:
    (a) placing said electrolyte in reactive contact with a mercury amalgam of the alkali of said salt; and
    (b) reducing alkali-metal reactive impurities in said electrolyte.

2. The method of claim 1, further comprising the steps of:
    (c) placing said electrolyte in reactive contact with an oxidizing agent; and
    (d) oxidizing oxidizable impurities in said electrolyte.

3. The method of claim 2, wherein said oxidizing agent can be chosen from a group consisting of: TiS$_2$; MnO$_2$; FeS$_2$; FeS; V$_2$O$_5$; MoS$_2$; and CuS.

4. The method of claim 2, wherein steps (c) and (d) are performed prior to step (a).

5. The method of claim 2, wherein steps (c) and (d) are performed after step (b).

6. The method of claim 1, further comprising the step of:
    (c) separating said mercury amalgam and said electrolyte after the reducing step (b).

7. The method of claim 2, further comprising the steps of:
    (e) separating said oxidizing agent and said electrolyte after the oxidizing step (d).

8. The method of claim 2, further comprising the step of:
    (e) heating said oxidizing agent and said electrolyte.

9. The method of claim 1 further comprising the step of:
    (c) heating said amalgam and said electrolyte.

10. The method of claim 1, wherein said reactive contact step (a) further comprises the step of:
    stirring said electrolyte and said mercury-alkali amalgam in a pressure vessel.

11. The method of claim 10, wherein said stirring is conducted at approximately 95° C.

12. The method of claim 2, wherein said oxidizing step (d) further comprises the step of:
    stirring said oxidizing agent and said electrolyte in a pressure vessel.

13. The method of claim 12, wherein said stirring is conducted at approximately 95° C.

14. The method of claim 1, wherein said electrolyte salt is preferably a lithium salt, and further wherein said mercury-alkali amalgam is a lithium-mercury amalgam containing approximately 5 atomic percent of lithium.

15. The method of claim 2, wherein said electrolyte salt is preferably a lithium salt, and further wherein said mercury-alkali amalgam is a lithium-mercury amalgam containing approximately 5 atomic percent of lithium.

16. The method of claim 1, wherein said organic solvent is selected from at least one of a group consisting of: ethers, esters, sulfones, organic sulfites, organic sulfites, organic sulfates, organic nitrites, and organic nitro compounds.

17. The method of claim 16, wherein said organic solvent contains at least dioxolane.

18. The method of claim 17, wherein said organic solvent is a mixture of dioxolane and dimethoxyethane.

19. The method of claim 2, wherein said organic solvent is selected from at least one of a group consisting of: ethers, esters, sulfones, organic sulfites, organic sulfates, organic nitrites, and organic nitro compounds.

20. The method of claim 2, wherein said organic solvent contains at least dioxolane.

21. The method of claim 2, wherein said organic solvent is a mixture of dioxolane and dimethoxyethane.

22. The method of claim 1, wherein the preferred alkali salt is an alkali-metal salt of an organoboron complex anion.

23. The method of claim 2, wherein the preferred alkali salt is an alkali-metal salt of an organoboron complex anion.

24. A method of purifying an electrolyte for use in alkali batteries, said electrolyte containing at least one alkali salt solute contained in at least one organic solvent, comprising the steps of:
(a) placing an oxidizing agent in reactive contact with said electrolyte; and
(b) oxidizing oxidizable impurities in said electrolyte.

25. The method of claim 24, wherein said oxidizing agent can be chosen from a group consisting of:
$TiS_2$; $MnO_2$; $FeS_2$; $FeS$; $V_2O_5$; $MoS_2$; and $CuS$.

26. The method of claim 24, further comprising the steps of:
(c) separating said oxidizing agent and said electrolyte after the oxidizing step (b).

27. The method of claim 24, further comprising the step of:
heating said oxidizing agent and said electrolyte.

28. The method of claim 24, wherein said oxidizing step (b) further comprises the step of:
stirring said oxidizing agent and said electrolyte in a pressure vessel.

29. The method of claim 28, wherein said stirring is conducted at approximately 95° C.

30. The method of claim 24, wherein said electrolyte salt is preferably a lithium salt.

31. A method of purifying an electrolyte for use in alkali batteries, said electrolyte containing at least one alkali salt solute contained in at least one organic solvent, comprising the steps of:
(a) adding to said electrolyte a mercury amalgam of the alkali of said salt; and
(b) sufficiently agitating said electrolyte containing said mercury-alkali amalgam to inactivate impurities in said electrolyte.

32. The method of claim 31, further comprising the steps of:
(c) adding an oxidizing agent to said electrolyte; and
(d) sufficiently agitating said oxidizing agent-containing electrolyte to inactivate impurities in said electrolyte.

33. The method of claim 32, wherein said oxidizing agent can be chosen from a group consisting of:
$TiS_2$; $MnO_2$; $FeS_2$; $FeS$; $V_2O_5$; $MoS_2$; and $CuS$.

34. The method of claim 32, wherein steps (c) and (d) are performed prior to step (a).

35. The method of claim 32, wherein steps (c) and (d) are performed after step (b).

36. The method of claim 32, further comprising the step of:
(e) filtering said oxidizing agent-containing electrolyte after the agitating step (d).

37. The method of claim 32, further comprising the step of:
heating the oxidizing agent-containing electrolyte.

38. The method of claim 31, further comprising the step of:
separating said mercury amalgam and said electrolyte after the agitating step (b).

39. The method of claim 31, further comprising the step of:
heating said amalgam and said electrolyte.

40. The method of claim 31, wherein said agitating step (b) further comprises the step of:
stirring said electrolyte containing said mercury-alkali amalgam in a pressure vessel.

41. The method of claim 40, wherein said stirring is conducted at approximately 95° C.

42. The method of claim 32, wherein said agitating step (d) further comprises the step of:
stirring said oxidizing agent-containing electrolyte in a pressure vessel.

43. The method of claim 42, wherein said stirring is conducted at approximately 95° C.

44. The method of claim 31, wherein said electrolyte salt is preferably a lithium salt, and further wherein said mercury-alkali amalgam is a lithium-mercury amalgam containing approximately 5 atomic percent of lithium.

45. The method of claim 32, wherein said electrolyte salt is preferably a lithium salt, and further wherein said mercury-alkali amalgam is a lithium-mercury amalgam containing approximately 5 atomic percent of lithium.

46. The method of claim 31, wherein said organic solvent is selected from at least one of a group consisting of: ethers, esters, sulfones, organic sulfites, organic sulfates, organic nitrites, and organic nitro compounds.

47. The method of claim 46, wherein said organic solvent contains dioxolane.

48. The method of claim 47, wherein said organic solvent is a mixture of dioxolane and dimethoxyethane.

49. The method of claim 32, wherein said organic solvent is selected from at least one of a group consisting of: ethers, esters, sulfones, organic sulfites, organic sulfates, organic nitrites, and organic nitro compounds.

50. The method of claim 32, wherein said organic solvent contains dioxolane.

51. The method of claim 32, wherein said organic solvent is a mixture of dioxolane and dimethoxyethane.

52. The method of claim 31, wherein the preferred alkali salt is an alkali-metal salt of an organoboron complex anion.

53. The method of claim 32, wherein the preferred alkali salt is an alkali-metal salt of an organoboron complex anion.

54. The method of purifying an electrolyte for use in alkali batteries, said electrolyte containing at least one alkali salt solute contained in at least one organic solvent, comprising the step of running said electrolyte through a column containing a mercury amalgam of the alkali of said salt in order to reduce alkali-metal reactive impurities in said electrolyte.

55. The method of claim 54, wherein said electrolyte salt is preferably a lithium salt, and further wherein said mercury-alkali amalgam is a lithium-mercury amalgam containing approximately 5 atomic percent of lithium.

56. The method of claim 54, wherein said organic solvent is selected from at least one of a group consisting of: ethers, esters, sulfones, organic sulfites, organic sulfates, organic nitrites, and organic nitro compounds.

57. The method of claim 56, wherein said organic solvent contains at least dioxolane.

58. The method of claim 57, wherein said organic solvent is a mixture of dioxolane and dimethoxyethane.

59. The method of claim 54, wherein the preferred alkali salt is an alkali-metal salt of an organoboron complex anion.

60. The method of purifying an electrolyte for use in alkali batteries, said electrolyte containing at least one alkali salt solute contained in at least one organic solvent, comprising the step of running said electrolyte through a column containing an oxidizing agent in order to oxidize oxidizable impurities in said electrolyte.

61. The method of claim 60, wherein said electrolyte salt is preferably a lithium salt.

62. The method of claim 60, wherein said organic solvent is selected from at least one of a group consisting of: ethers, esters, sulfones, organic sulfites, organic sulfates, organic nitrites, and organic nitro compounds.

63. The method of claim 62, wherein said organic solvent contains at least dioxolane.

64. The method of claim 63, wherein said organic solvent is a mixture of dioxolane and dimethoxyethane.

65. The method of claim 60, wherein the preferred alkali salt is an alkali-metal salt of an organoboron complex anion.

* * * * *